United States Patent [19]

Lee

[11] Patent Number: 5,696,943
[45] Date of Patent: Dec. 9, 1997

[54] METHOD AND APPARATUS FOR QUICK AND RELIABLE DESIGN MODIFICATION ON SILICON

[75] Inventor: Dennis Lee, San Jose, Calif.

[73] Assignee: Advanced Micro Devices, Inc., Sunnyvale, Calif.

[21] Appl. No.: 508,200

[22] Filed: Jul. 27, 1995

[51] Int. Cl.$^6$ .................................................. G06F 17/50
[52] U.S. Cl. .......................... 395/500; 364/488; 364/489; 364/490
[58] Field of Search ........................... 395/500; 29/571; 365/200; 307/202.1; 364/490, 488, 489; 371/5.5, 10.1; 326/39, 49, 55; 257/685

[56] References Cited

U.S. PATENT DOCUMENTS

| | | | |
|---|---|---|---|
| 4,319,396 | 3/1982 | Law et al. | 29/571 |
| 4,471,472 | 9/1984 | Young | 365/200 |
| 4,485,459 | 11/1984 | Venkateswaran | 365/200 |
| 4,494,220 | 1/1985 | Dumbri et al. | 365/200 |
| 4,590,388 | 5/1986 | Clemons et al. | 307/202.1 |
| 4,931,946 | 6/1990 | Ravindra et al. | 364/490 |
| 5,157,618 | 10/1992 | Ravindra et al. | 364/490 |
| 5,337,318 | 8/1994 | Tsukakoshi et al. | 371/5.5 |
| 5,416,740 | 5/1995 | Fujita et al. | 365/200 |
| 5,426,379 | 6/1995 | Trimberger | 326/39 |
| 5,434,868 | 7/1995 | Aichelmann, Jr. et al. | 371/10.1 |
| 5,502,333 | 3/1996 | Bertin et al. | 257/685 |
| 5,568,067 | 10/1996 | McDermott et al. | 326/55 |
| 5,592,107 | 1/1997 | McDermott et al. | 326/49 |

OTHER PUBLICATIONS

"Fault Trees and Sequence Dependencies", by J. Dugan et al., IEEE, Reliability & Maintainability, 1990 Symposium, pp. 286–293.

"A Parallel Algorithm for Allocation of Spare Cells on Memory Chips", by N. Funabiki et al., IEEE Transactions on Reliability, vol. 40, No. 3, Aug. 1991, pp. 338–346.

"Design and Analysis of Defect Tolerant Hierarchical Sorting Networks", by S. Kuo et al., IEEE, Wafer Scale Integration, 1992 International Conference, May 1992, pp. 240–249.

"Restructuring WSI Hexagonal Processor Arrays", by R. Venkateswaran et al., IEEE Transactions on Computer–Aided Design, vol. 11, No. 12, Dec. 1992, pp. 1574–1585.

"Faust: A Fault Tolerant Sparing Technique for ATM Switch Architectures", by K. Padmanabhan, Globecom '93: IEEE Global Telecommunications Conference, 1993, pp. 1368–1374.

"An Efficient Architecture for Fault–Tolerant ATM Switches", by K. Padmanabhan, IEEE/ACM Transactions on Networking, vol. 3, No. 5, Oct. 1995, pp. 527–537.

*Primary Examiner*—Kevin J. Teska
*Assistant Examiner*—Russell W. Frejd
*Attorney, Agent, or Firm*—Davis Chin

[57] ABSTRACT

In order to reduce product's time to market, a designer has to plan for debugging silicon before the first tape out. Having the proper type of spare gates at the desirable location will limit the number of new masks to three if not just one. Moreover, when these spare gates are easy to locate and are in the proper format, a FIB system can be used to debug the silicon and test the new fixes in real system environment before the next tape out. Thus, the spare gate strategy can limit the iteration of mask changes to just one, and this will speed up the time to market and bring higher profit from the product.

6 Claims, 4 Drawing Sheets

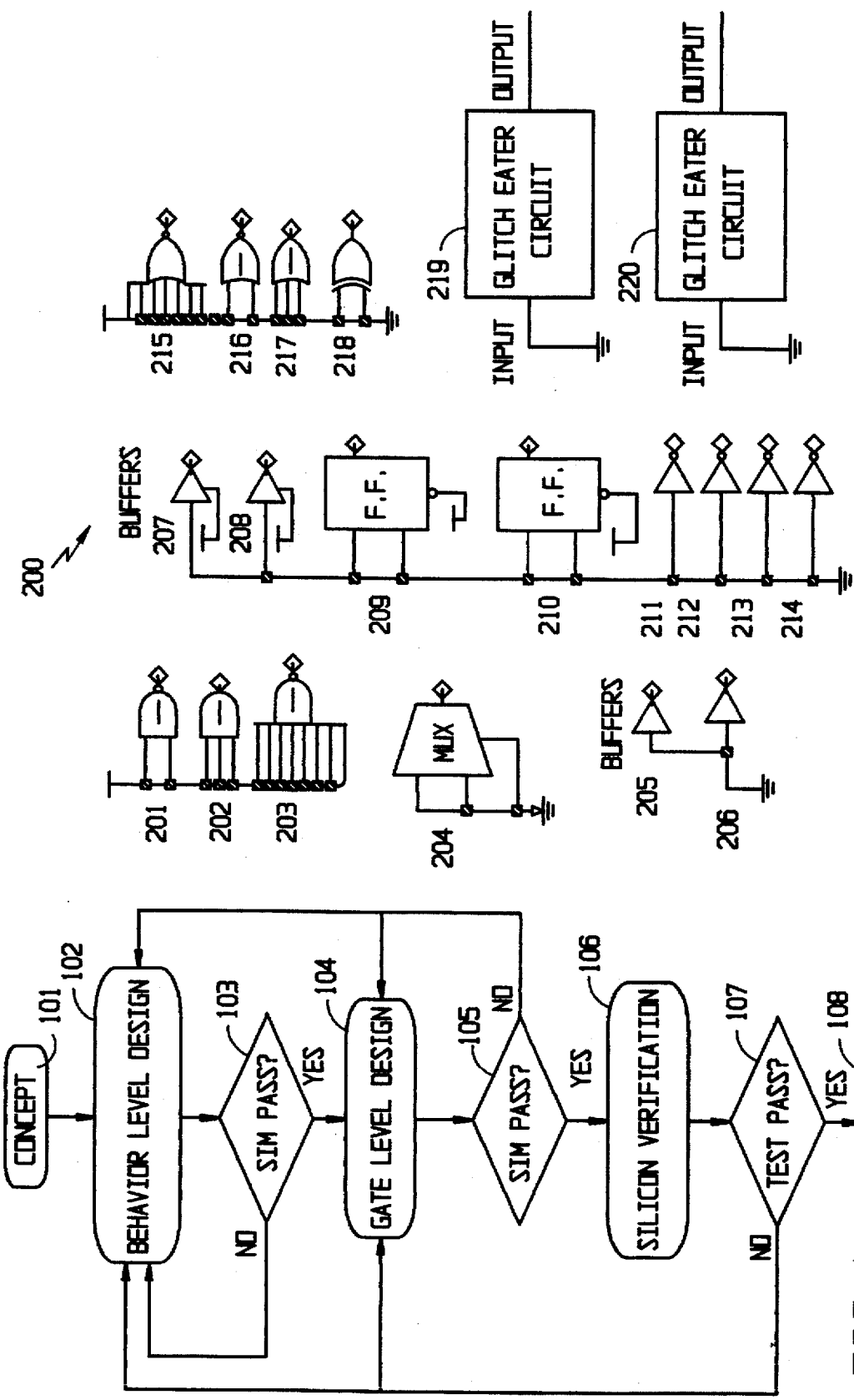

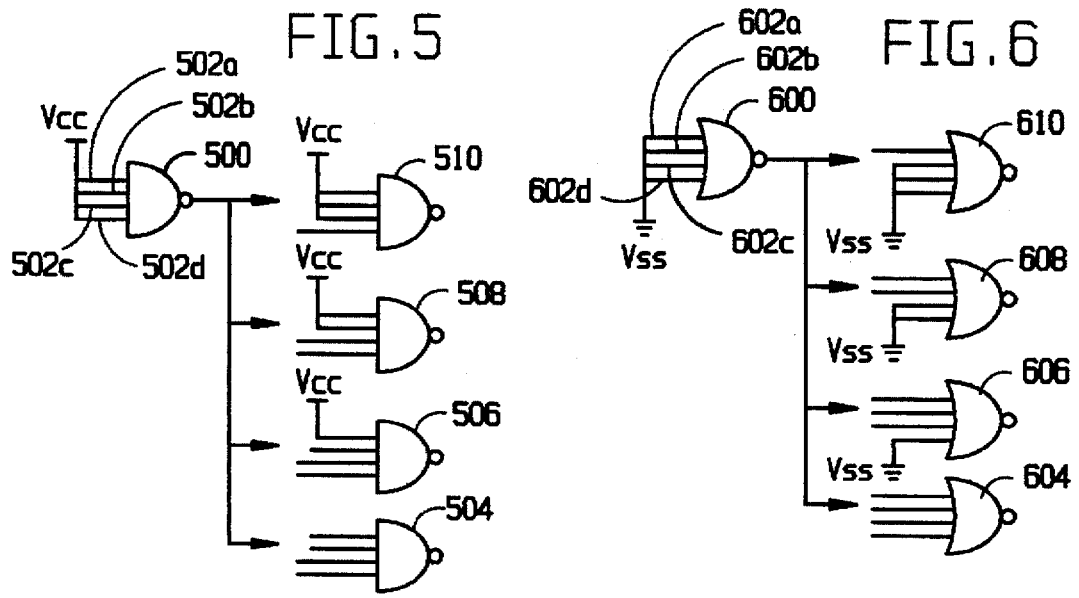
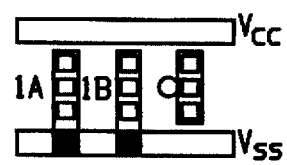
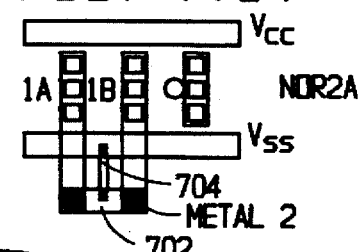
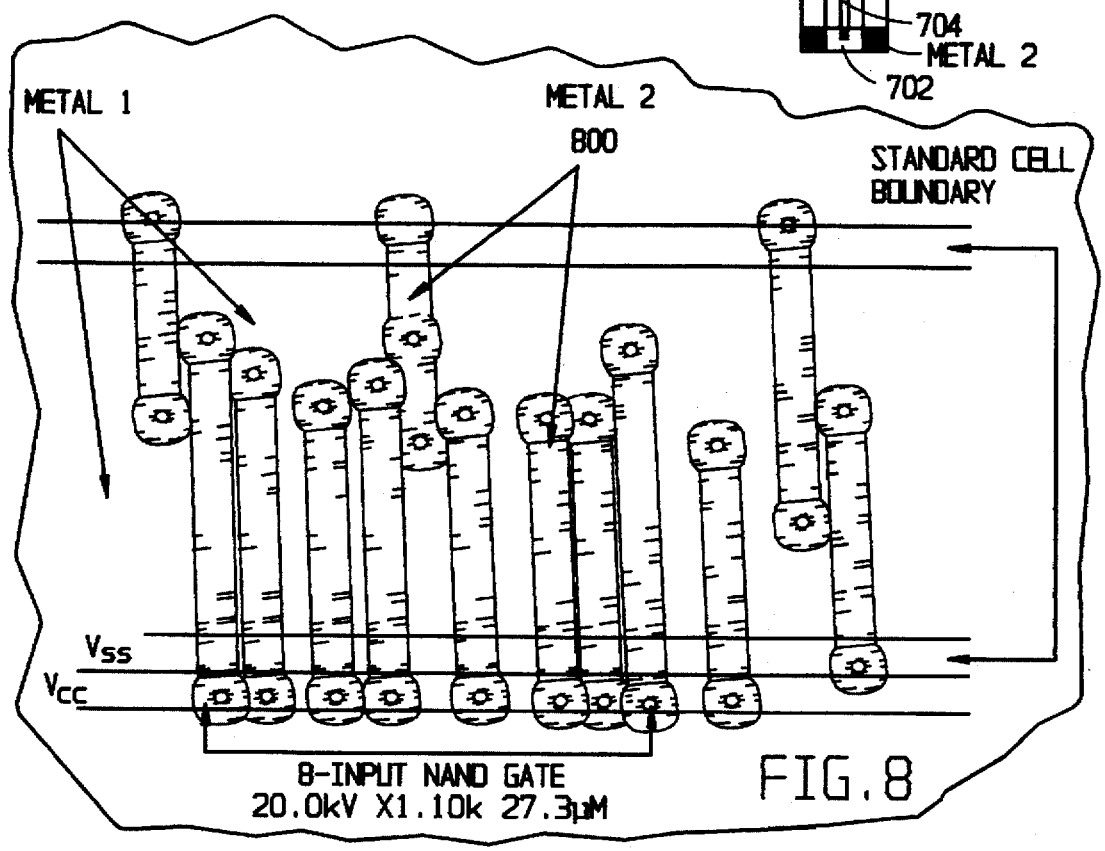

METHOD AND APPARATUS FOR QUICK AND RELIABLE DESIGN MODIFICATION ON SILICON

BACKGROUND OF THE INVENTION

This invention relates generally to systems for performing circuit modifications on a semiconductor integrated circuit chip. More particularly, it relates to an improved method and apparatus for effecting design modifications on a silicon chip quickly and reliably in a more effective and efficient manner.

In view of the rapid advancements made in the technology of integrated circuit development, a product's time to market has decreased drastically. In order to be competitive and to gain an advantage by introducing a product before their competitors, the silicon manufacturers are required to reduce the product development cycle. As shown in the flow chart of FIG. 1, this product development cycle can be divided into five (5) basic phases consisting of concept, behavior level design, gate level design, silicon verification, and, finally, production. Obviously, in order to bring the product to market fast, the IC development team must minimize the amount of time spent on each phase of the development cycle. More importantly, the team has to avoid repeating any phase for error corrections.

As can be seen from FIG. 1, the flow chart of the development cycle begins with the concept phase in block 101, which is then followed by the behavior level design phase in block 102. If an error is found after the block 102 in the first test block 103, then an iteration of the behavior level phase 102 is performed. On the other hand, if no errors are found the gate level design phase is reached in the block 104. Again, if an error is determined to exist after the block 104 in the second test block 105, an iteration of the behavior level phase 102 or the gate level design phase 104 has to be made again. If there are no errors in the block 105, then the silicon verification phase is reached in the block 106. Again, a test for errors is performed in the block 107. Assuming that the behavior level design phase 102, gate level design phase 104, and the silicon verification phase 106 have all been passed, via the third test block 107, then the product can be released to the production phase in block 108 for making the product.

However, if an error is found in the third test block 107 then an iteration of the behavior level phase 102 to the silicon verification phase 106 or the gate level phase 104 to the silicon verification phase 106 has to be repeated once again. Therefore, this will add a significant amount of time to the development cycle since each successive phase will generally require larger amounts of time to perform. Consequently, the key element in reducing the product development cycle is to minimize the number of iterations for the silicon verification phase 106.

As of today, many CAD vendors have developed the tools that will decrease behavior level and gate level design times, but there are only a relatively small number of tools that will minimize the design modification time on silicon. In fact, the modification time after the silicon verification takes much longer than the modification time at behavior level design or gate level design. Thus, the debugging and error correction time become a crucial factor to the time-to-market. Traditionally, debugging parts and remanufacturing silicon with new masks have taken weeks if not months of the precious development time. Obviously, the fewer the number of new masks and iterations required, the shorter the development time will be.

The latest breakthrough in debugging methodology is a FIB (Focused-Ion-Beam) system which can correct problems at the wafer or package level by re-routing circuits using its cutting and deposition capabilities. In other words, a development team can actually implement the fixes on the real silicon within a few hours, and they can verify the bug fixes in real system environment before taping out any new mask layers. However, the complexity and the size of today's ICs limit the usage of a FIB system. Unless spare gate strategy is implemented before the place and route phase, FIB modification will be a difficult task, if not impossible.

One of the FIB system limitations is that appropriate spare gates have to exist in order for a FIB system to reconnect the circuits to fix the errors. Because a FIB system can only deposit one layer of metal, it cannot create a desirable circuit. Secondly, the spare gates have to be located a short distance away from the problem gates. If the spare gates are far away, a FIB system will not only take much longer to deposit the metal, but more importantly, the reliability of a FIB system decreases exponentially as the distance of deposited metal increases. As the ICs become larger and more complex, the odds of spare gates being available to the needed circuits get smaller unless the development team plans the location of spare gates wisely. Lastly, the spare gate inputs and outputs should be in a friendly format for a FIB system to use because there is a possibility that the existing circuit may be destroyed while cutting or drilling a hole for depositing metal. To overcome these limitations, and to use a FIB system effectively, good planning is required before the first tape out.

Traditionally, the development teams have used few different ways to implement the spare gates. One way is to add spare gates to empty places after the layout has been completed. This method has created serious problems since the spare gates are often located too far away from the troubled circuits and also because the routing is so dense that there is no room to connect new metal lines from the spare gates to the problem gates. To solve this problem, the development team has connected the spare gates to outputs of existing circuits. However, this is a very time-consuming effort to identify the node and attach spare gates one by one, especially when the gate level design is done by the synthesis tools.

Using previous methods, the needed logic or timing adjustments often cannot be created by existing spare gates. This forced the development team to change all mask layers which is very expensive and time-consuming. Thus, to limit the new mask changes to a minimum, the inventor of the present invention has developed a strategy of spare gates' type, location, and format so as to ensure that the appropriate spare gates are available near the problem gates.

SUMMARY OF THE INVENTION

Accordingly, it is a general object of the present invention to provide an improved method and apparatus for effecting design modifications on a silicon chip quickly and reliably in a more effective and efficient manner.

It is an object of the present invention to provide an improved method and apparatus for effecting design modifications on a silicon chip which includes providing different types of spare cells of most frequently used standard cells in the design.

It is another object of the present invention to provide an improved method and apparatus for effecting design modifications on a silicon chip which includes providing spare cells formed of high input NAND logic gates, high input NOR logic gates, delay circuits, and buffers.

It is still another object of the present invention to provide an improved method and apparatus for effecting design modifications on a silicon chip which includes the step of grouping the spare gates relative to timing sensitive blocks prior to the place and route phase so as to locate the spare gates near potential defective gates.

It is yet still another object of the present invention to provide an improved method and apparatus for effecting design modifications on a silicon chip which includes the step of formatting the gates so that they can be easily connected to the defective gates without causing damage to the existing circuits.

The instant invention shows how to prepare for the design modification on the silicon after the first tape-out. This present invention specifically shows what and how to position spare gates into the design so that the spare gates can be most useful. This is accomplished by a spare gate strategy which can be divided into three categories: (1) type, (2) location, and (3) format.

The type of spare cells should be made of the most frequently used standard cells in the design since they are most likely to be needed to fix any errors. The list of spare gates should include a high number input NAND gates and NOR gates since they can be easily converted into low input NAND gates or NOR gates. In addition, the list of spare gates should have delay cells for timing adjustment and buffers which can drive high capacitance.

In addition to the type of spare gate, the location is also very important. The spare gates should be grouped with the timing sensitive blocks prior to the place and route phase so that they will be located near potential problem gates. Also, by grouping the spare gates with the several different physical blocks, the spare gates will be spread throughout the layout instead of being clustered into one corner of the layout.

Lastly, the spare gates should be formatted so that they can be easily connected to the problem gates without damaging the existing circuits. For instance, the inputs of spare gates should be tied to either a positive power supply potential or voltage VCC or a ground potential VSS by top-layer metal because as compared to poly or low layer metal, top-layer metal is much easier to locate and connect using the FIB system. Moreover, the metal lines should be connected at the routing channel outside of the standard cells. Also, the inputs of NAND or AND gates should be tied to the positive potential VCC, and the inputs of NOR and OR gates should be tied to the ground potential VSS.

By following these spare gate design guidelines, the development team has a higher chance that they will correct all the errors in just three layers of mask. Consequently, the development team will save the cost difference between three layer masks and all layer masks. Furthermore, changing only three layers will reduce the time to make the silicon and qualify the silicon; hence, the spare gate guidelines will definitely reduce the time to market.

Another reason the spare gate guideline will save money and reduce the time to market is that this strategy of the present invention minimizes the iteration of the silicon verification phase. Having proper spare gates at the desired location, the development team can implement the bug fixes on real silicon, and they can test the fixed silicon on the real system environment. Thus, they can verify all the corrections on real silicon before new tape out and can avoid another tape-out because the new fixes had not worked on the real silicon using the original method.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a flow chart of the development cycle for a product between the concept phase through the production phase;

FIG. 2 is a schematic circuit diagram of a spare gate set;

FIG. 5 shows the inputs of an NAND logic gate being tied to VCC so that it can be flexibly converted to a three input NAND gate, two input NAND gate, or an inverter with the minimum amount of changes;

FIG. 6 shows the inputs of a NOR logic gate being tied to VSS so that it can be flexibly converted to a three input NOR gate, two input NOR gate, or an inverter with the minimum amount of changes;

FIG. 7(a) shows the inputs of a spare NOR gate being connected to the ground potential VSS within the standard cell;

FIG. 7(b) shows the inputs of a spare NOR gate being connected to the ground potential VSS by top layer (i.e., metal 2 if two layer metal) metal on the outside of the standard cells; and FIG. 8 is a pictorial illustration of an 8-input spare NAND gate in silicon, showing all the inputs being connected to the positive potential VCC via the metal 2 layer.

DESCRIPTION OF THE PREFERRED EMBODIMENT

Figure 3:
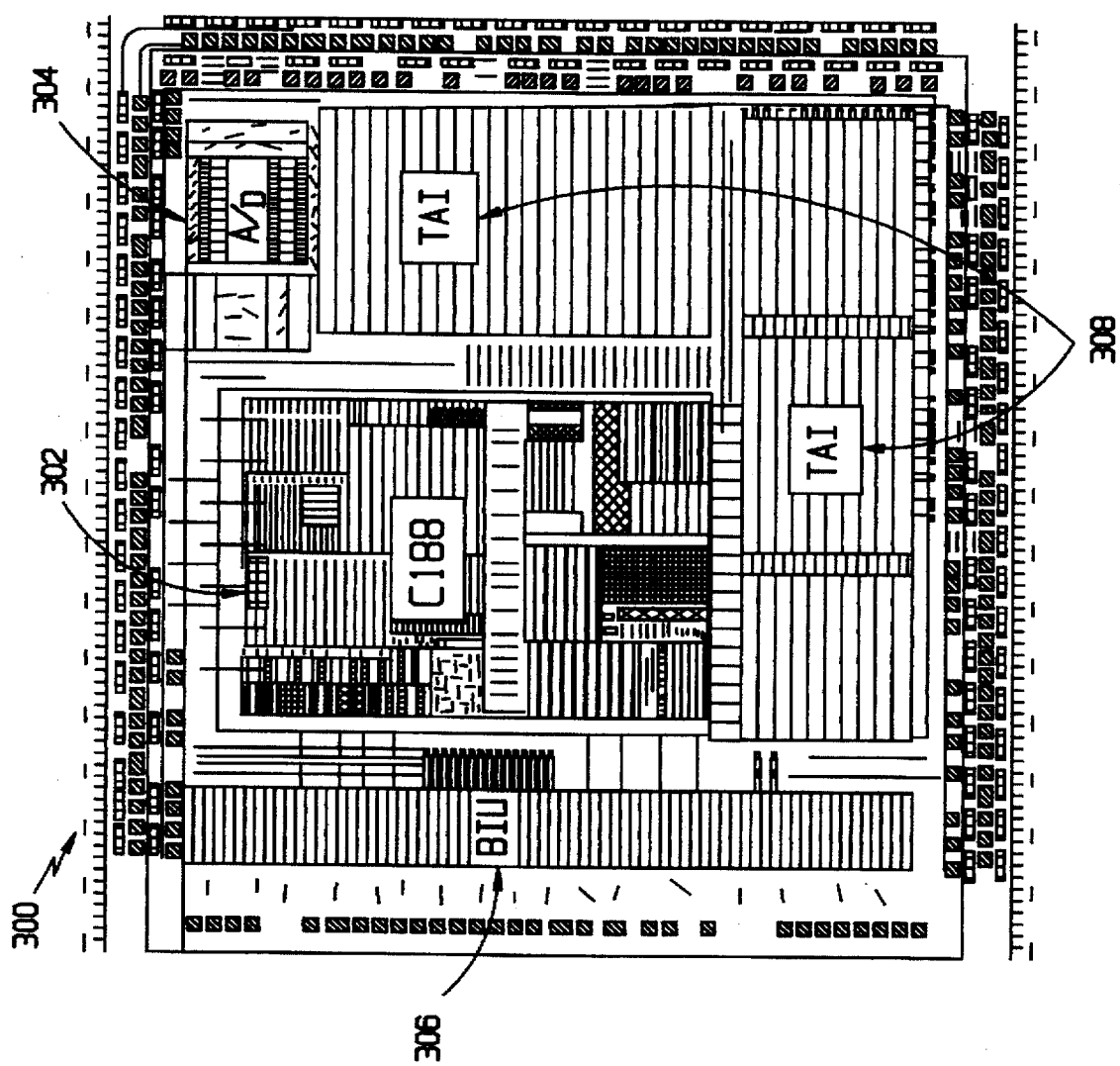
FIG. 3 is a layout for a wireless LAN product, illustrating the various component sections thereof.

It is to be distinctly understood at the outset that the present invention shown in association with a wireless LAN product is not intended to serve as a limitation upon the scope or teachings thereof, but is merely for the purpose of convenience of illustration of one example of its application. The present invention has numerous applications in other fields and apparatus since the invention pertains to a method and apparatus for effecting design modifications on a silicon chip quickly and reliably in a more efficient and economical basis.

In order to reduce the product's time to market, the development team needs to prepare a plan before the first tape out for possible future layout modification. This plan includes the spare gate strategy of the present invention which enables spare gates to be used in the most efficient way. To be most useful, the spare gates are made in the proper type, location, and format.

With respect to the appropriate types of spare gates, after the completion of a synthesis of a product design a statistical list of existing cell types and numbers in the product design would be generated. Based upon reviewing of this list, the most frequently used standard cells in the design would then be selected as the types of spare gates defining a spare gate set since they will be most likely to be used in order to fix or repair any errors. For instance, a signal may need to be delayed by several nanoseconds for a timing adjustment. For this timing adjustment, several delay cells, which can be ranged from 2 ns to 15 ns, should be a part of the spare gates. Without these delay cells, many of the existing combinatorial spare gates, which typically can only delay 0.5 ns to 1 ns, have to be chained together to achieve several nanoseconds delay. For example, if the delay time of an inverter is 0.5 ns and the delay time of an AND gate is 1 ns, ten inverters and five AND gates have to be connected as a chain in order to delay a signal by 10 ns. As a result, a lot of spare gates are consumed for one fix, and it may leave no additional spare gates for other fixes.

In addition to the delay cells, several buffers with high drive strength (i.e., W/L=36/18 to 54/27) should be included in the spare gate list. As the ICs become larger, the spare gates may need to be connected to the gates which are located a long distance away. At the same time, in order to be effective, the spare gates should be able to handle high capacitance. However, it is not necessary to increase the size of all the spare gates because not all the spare gates need to drive high capacitance and because increasing drive strength will also increase spare gate sizes. Instead, several high drive strength buffers should be available the to the needed spare gates.

Also, the type of the spare gates should be flexible. High input (i.e., 4 to 8 inputs) NAND, AND, NOR, and OR gates should be included in the spare gates, and these gates can flexibly become lower input combinatorial gates as needed. For example, a five input NAND gate can be used as a four input NAND, a three input NAND, a two input NAND, or an inverter. Thus, the chance of these flexible gates being used is high.

In FIG. 2, there is shown a schematic circuit diagram of a spare gate set 200. As can be seen, the spare gate set 200 includes high-number input NAND logic gates 201, 202, 203; multiplexer 204; buffer 205; high strength buffer 206; tri-state buffers 207, 208; resettable flip-flops 209, 210; inverters 211–214; high-number input NOR logic gates 215–217; exclusive OR logic gate 218; and glitch eater circuits 219, 220 having delay cells formed therein.

In addition to being of the proper type, the location of spare gates is also very important. If the spare gates are not included in the design prior to the place and route, the spare gates will be either too far away from the problem gates or there will be no room left to connect the spare gates to the problem gates because the routing channels will be too congested. As the place and route tools become more efficient, routing channels will be more congested to the point of not being able to connect to the spare gates unless the spare gates are next to the problem gates. Not only that, the spare gates should be duplicated in several spare gate lists, and each spare gates list should be grouped with the timing sensitive block such as state machines and counters. By doing so, the spare gates will be spread throughout the layout as the time sensitive blocks are spread throughout the layout, and the spare gates will have a high chance of being next to the trouble circuits. Thus, these spare gates will be usable for design modification by the FIB system.

In FIG. 3, there is shown a general layout of a wireless LAN (local area network) product 300 which illustrates the various component sections therein. It will be noted that the wireless LAN product 300 includes a microcomputer section 302 (C188), an A/D converter section 304, a bus interface section 306 (BIU), and a Transceiver Attachment Interface section 308 (TAI). The TAI section 308 generally includes timing sensitive logic blocks (i.e., counters, state machines) which may become defective during its operation. Thus, the spare gate strategy of the present invention is illustrated in FIG. 4 with respect to the TAI section 308.

Figure 4:
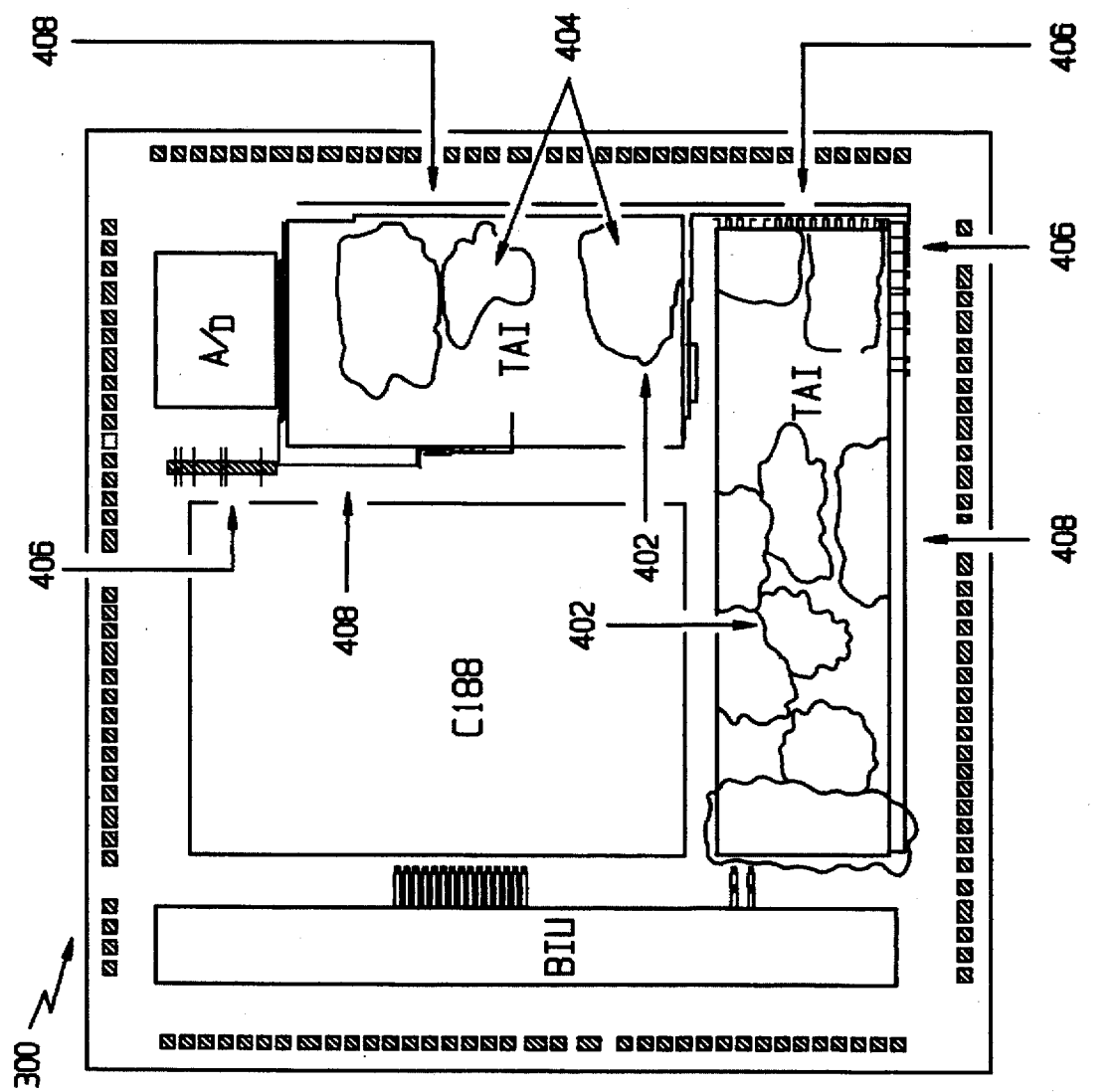
FIG. 4 is a layout similar to FIG. 3, illustrating the techniques of the present invention for the TAI section.

With particular reference to FIG. 4, it can be seen that a plurality of spare gate sets 402, similar to the one of FIG. 2, are grouped with the timing sensitive logic blocks in the TAI section 308 of the LAN product 300. It should be noted that the spare gates are included in the design prior to the place and route phase so that the spare gates will be spread throughout the layout. The plurality of spare gate sets 402 are spread throughout the TAI section 308 by grouping them with the several different logic blocks within the TAI section. By using the "soft group" feature of the Place and Route tool, some of the logic blocks in the TAI section 308 are identified as crucial, such as the soft group regions 404, so that the spare gate sets are located near these regions. After completion of the placed and routed spare gate sets 402, additional sets of spare gates 406 are manually placed in empty spots on the layout. Further, several spare lines 408 from the spare gate 406 to the logic blocks where spare gates are not easily accessible are deposited. These spare lines 408 are generally connected to the ground potential.

Lastly, the format of the spare gates has a major impact on their usage. All the inputs of NAND (also AND) gates are to be tied to the positive potential VCC so that a minimum amount of modifications are needed to be used. For example, if all the inputs of a five input NAND gate are connected to the positive potential VCC, only four FIB operations (two cuts and two connections) are needed to modify a five input NAND gate to be used as a two input NAND gate. This is extremely important if the silicon is modified by the FIB system where additional alterations result in longer modification time and higher risk.

In particular, there is shown in FIG. 5 a NAND logic gate 500 having its inputs 502a through 502d all connected to a positive power supply potential or voltage VCC. In this way, for instance, the NAND logic gate 500 can be flexibly converted to a four-input NAND logic gate 504, a three-input NAND logic gate 506, a two-input NAND logic gate 508, or an inverter 510 with a minimum number of changes.

Similarly, all the inputs of NOR (also OR) gates are to be tied to the ground potential VSS so that a minimum amount of modifications will be required. For instance, if all the inputs of a five input NOR gate are connected to the ground potential VSS, only four operations (two cuts and two connections) are needed to modify a five input NOR gate to be a function as a two input NOR gate.

More specifically, there is shown in FIG. 6 a NOR logic gate 600 having its inputs 602a through 602d all connected to a ground potential or voltage VSS. In this way, for instance, the NOR logic gate 600 can be flexibly converted to a four-input logic gate 604, a three-input NOR logic gate 606, a two-input NOR logic gate 608, or an inverter 610 with a minimum number of changes.

Top layer metal (metal 2 if two layer metal process) are to be used to connect inputs of spare gates to the potential VCC or VSS because top layer metals are much easier to identify, cut, and connect than low layer metals or poly. Having the inputs and outputs of spare gates connected in top layer metal will make the debugging process (i.e., FIB system) faster and more reliable.

To make them even more reliable when being used in the FIB system, all the connections from spare gates are made in the routing channels outside of the standard cell area. If the metal are connected in over the poly or active regions, these regions can be damaged as holes are drilled to cut or make connections to the metals.

In FIG. 7(a), there is depicted a pictorial layout of a two-input NOR logic gate NOR2A whose inputs 1A and 1B are connected to the ground potential VSS within the standard cell. Thus, the poly or active regions may be damaged when cutting or drilling holes so as to deposit the metals. In order to overcome this problem, there is depicted in FIG. 7(b) a pictorial layout of a two-input NOR logic gate NOR2A whose inputs 1A and 1B are connected to a top layer metal 702 (i.e., metal-2 if there is a two-layer metal) on the outside of the standard cells. The top layer metal 702 is then connected to the ground potential VSS via metal deposit connection 704.

In FIG. 8, there is a pictorial illustration of an 8-input spare NAND logic gate in a silicon substrate. As can be seen more clearly, the vertical metal-2 layer 800 are easily recognizable and are used to connect the eight inputs of the NAND spare logic gate to the supply potential VCC outside of the standard cell boundary.

From the foregoing detailed description, it can thus be seen that the present invention provides an improved method and apparatus for effecting design modifications on a silicon chip quickly and reliably in a more effective and efficient manner. This is accomplished in the present invention by the use of a spare gate strategy consisting of three categories—type, location, and format.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A method for effecting quickly and reliably design modifications on a silicon chip comprising the steps of:
    providing a plurality of spare gate sets, each set containing the types of standard spare cells most frequently used in the design;
    each of said plurality of spare gate sets including a combination of high-numbered input NAND logic gates, high-numbered input NOR logic gates, buffers, inverters, flip-flops, and glitch eater circuits;
    locating the plurality of spare gate sets to be near potential problem gates which are to be fixed or repaired;
    the locating step including the step of each of said plurality of spare gate sets with several different logic blocks on the silicon chip so that the plurality of spare gate sets will be spread throughout the layout of the silicon chip;
    formatting of the plurality of spare gate sets so as to be easily connectible to the potential problem gates without causing damage to other existing circuits on the silicon chip;
    the formatting step including the step connecting all of the inputs of the NAND logic gates to a positive power supply potential; and
    the formatting step further including the step of connecting all of the inputs of the NOR logic gates to a ground potential.

2. A method as claimed in claim 1, further includes the step of utilizing a top-layer metal for making connections to the positive power supply potential or ground potential.

3. A method as claimed in claim 2, further comprising the step of providing metal lines for connecting the top-layer metal to the inputs of the NAND or NOR logic gates outside of the standard cell boundary.

4. An apparatus for effecting quickly and reliably design modifications on a silicon chip comprising:
    disposing a plurality of spare gate sets on the silicon chip, each set being formed of the types of standard spare cells most frequently used in the design;
    said plurality of spare gate sets including a combination of high-numbered input NAND logic gates, high-numbered input NOR logic gates, buffers, inverters, flip-flops and glitch eater circuits;
    means for locating the plurality of spare gate sets to be near potential problem gates which are to be fixed or repaired;
    each of the plurality of spare gate sets being grouped with several different logic blocks on the silicon chip so that the plurality of spare gate sets will be spread throughout the layout of the silicon chip;
    means for formatting of the plurality of spare gate sets so as to be easily connectible to the potential problem gates without causing damage to other existing circuits on the silicon chip;
    all of the inputs of the NAND logic gates being connected to a positive power supply potential; and
    all of the inputs of the NOR logic gates being connected to a ground potential.

5. An apparatus as claimed in claim 4, wherein a top-layer metal is provided for making the connections to the positive power supply potential or ground potential.

6. An apparatus as claimed in claim 5, wherein metal lines are provided for connecting the top-layer metal to the inputs of the NAND or NOR logic gates outside of the standard cell boundary.

* * * * *

UNITED STATES PATENT AND TRADEMARK OFFICE
CERTIFICATE OF CORRECTION

PATENT NO. : 5,696,943
DATED : December 9, 1997
INVENTOR(S) : Dennis Lee

It is certified that error appears in the above-indentified patent and that said Letters Patent is hereby corrected as shown below:

Column 7, line 46, before "each", insert --grouping--.

Signed and Sealed this

Seventeenth Day of February, 1998

Attest:

BRUCE LEHMAN

Attesting Officer    Commissioner of Patents and Trademarks